United States Patent [19]

Ishimoto

[11] Patent Number: 4,570,092
[45] Date of Patent: Feb. 11, 1986

[54] DRIVING APPARATUS USEFUL IN A MOVABLE TOY

[75] Inventor: Zenichi Ishimoto, Tokyo, Japan

[73] Assignee: Nikko Co., Ltd., Tokyo, Japan

[21] Appl. No.: 426,739

[22] Filed: Sep. 29, 1982

[30] Foreign Application Priority Data

Dec. 30, 1981 [JP] Japan ............................. 56-101646

[51] Int. Cl.⁴ .......................................... H02K 41/00
[52] U.S. Cl. ........................................ 310/12; 310/46; 104/290
[58] Field of Search ........................... 46/235, 234, 45; 104/290, 292, 294; 310/12, 13, 14, 46; 446/129, 130, 133, 134, 135, 136, 484

[56] References Cited

U.S. PATENT DOCUMENTS

| 776,826 | 12/1904 | Caldwell | 310/13 |
| 964,498 | 7/1910 | Dean | 310/12 |
| 1,863,294 | 6/1932 | Bogia | 310/46 |
| 2,583,741 | 1/1952 | Kiler | 46/235 X |
| 2,794,929 | 6/1957 | Adamski | 46/235 X |
| 3,292,065 | 12/1966 | Fredrickson | 310/14 X |
| 3,883,136 | 5/1975 | Kim | 46/235 X |

Primary Examiner—Mickey Yu

[57] ABSTRACT

A driving apparatus for use in a movable toy is disclosed, and includes a mobile body, an immobile body, a plurality of permanent magnets fixed to the mobile or immobile body, at least one electromagnet fixed to the other body so as to co-operate with the permanent magnets, a pair of contactless switches, and a circuit for exciting the electromagnet winding depending on the state of energization of the contactless switches and the position of the permanent magnets relative to the electromagnet. The driving apparatus is capable of not only rotary movement but also straight movement.

4 Claims, 5 Drawing Figures

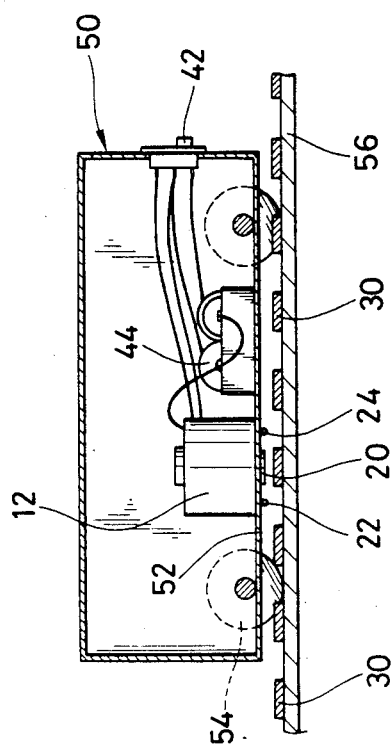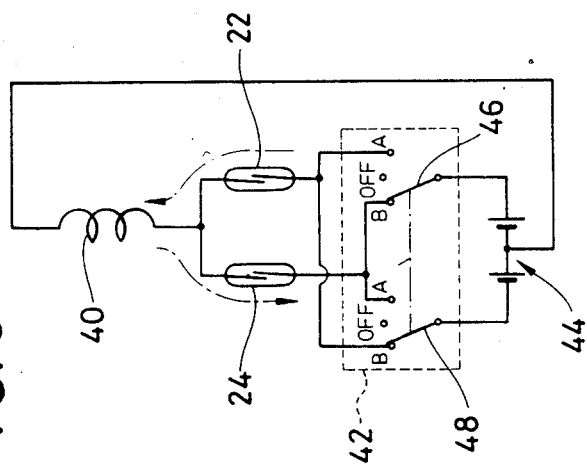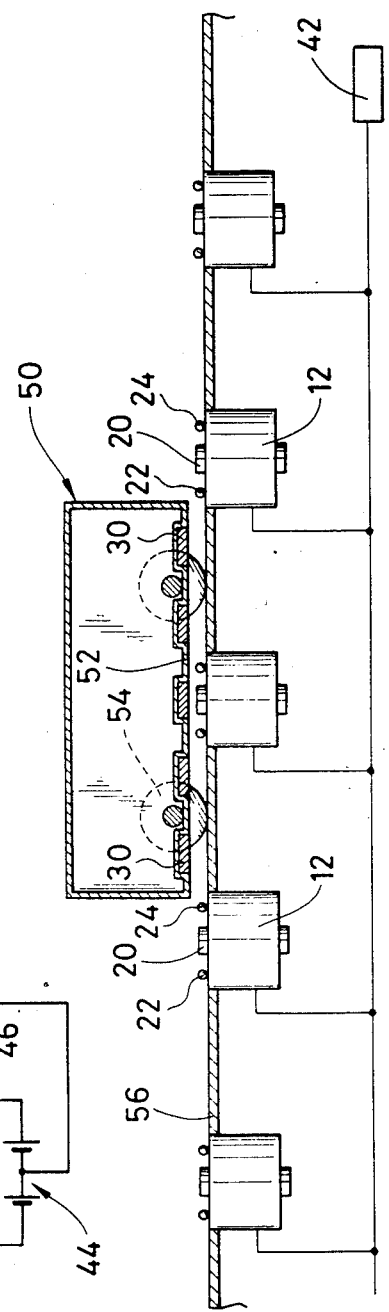
FIG. 4
FIG. 5
FIG. 3

4,570,092

DRIVING APPARATUS USEFUL IN A MOVABLE TOY

FIELD OF THE INVENTION

This invention relates to a novel driving apparatus for imparting to a toy either rotary or straight movement, by a combination of cooperating permanent magnets and electromagnet(s).

BACKGROUND OF THE INVENTION

Heretofore, a DC motor has been used as a driving apparatus for a movable toy. The DC motor comprises a field winding, an armature and a commutator. The field generally consists of, in a simple structure, a stator comprising a permanent magnet with N and S poles, and arranged with a certain gap in relation to the armature to form a magnetic circuit. The armature consists of a rotor comprising a winding and a core mounted on a rotary shaft. The commutator is a part which affords electrical connection with the winding of the armature and is connected to a DC source through a brush. In the DC motor thus constructed, the direct current is fed to the brush, to the commutator and then to the winding, to cause rotation of the armature.

Where the DC motor comprises the armature and the commutator supplies current directly thereto by means of the brush, rotation of the armature causes friction between the commutator and the brush contacted therewith and generates sparks therebetween. As a result, the brush is prematurely worn which adversely affects the motor operation so that motor life is reduced. Moreover, in a conventional motor only rotary movement is produced to the exclusion of rectilinear movement, which limits its application.

SUMMARY OF THE INVENTION

Accordingly a general object of the invention is to provide a novel driving apparatus which eliminates the problems associated with conventional driving apparatus and which enabling both rotary and rectilinear movement, with increased durability.

A principle object of the invention is to provide a driving apparatus which comprises a mobile body, an immobile body, a plurality of permanent magnets fixed to the mobile or immobile body and spaced apart a predetermined distance with their polarities oriented in one and the same direction, at least one electromagnet fixed to the immobile or mobile bodies so as to be spaced from and in facing relation to the permanent magnets and defining a predetermined gap with facing permanent magnets, a pair of contactless switches, each arranged adjacent and symmetrically on opposite sides of a pole of the electromagnet, and a circuit for exciting the electromagnet so as to generate an attractive force relative to a given permanent magnet when one of the contactless switches is in a closed position, which closure is effected by the magnetic field of the given permanent magnet during relative movement of the mobile and immobile bodies, while generating a repulsive force relative to the given permanent magnet when the other contactless switch is closed by the given permanent magnet during said relative movement of said mobile and immobile bodies.

Another object of the invention is to provide a driving apparatus wherein a combination of the electromagnet and the pair of the contactless switches is securely mounted to a frame and a disk is rotatably mounted adjacent the electromagnet, said disk being provided at its circumference with the plurality of the permanent magnets in predetermined spaced apart relation on the disc in facing relation to the pole of the electromagnet.

Still another object of the invention is to provide a driving apparatus wherein the combination of the electromagnet and the pair of the contactless switches is placed on the bottom of a mobile body, while the plurality of the permanent magnets are arranged on a base oppositely to a core of the electromagnet along a moving direction of the mobile body for movement a predetermined distance.

A further object of the invention is to provide a driving apparatus wherein the plurality of the permanent magnets are arranged in the moving direction of the mobile body at its bottom along a predetermined distance, while the combination of a plurality of the electromagnets and the contactless switches is arranged on a base opposite to the permanent magnets in the moving direction of the mobile body for movement a predetermined distance.

A still further object of the invention is to provide the driving apparatus wherein the circuit for exciting a coil of the electromagnet is connected to a DC source for connecting the pair of the contactless switches in parallel to the exciting coil and to actuate the pair of contactless switches for energizing the exciting coil of the electromagnet to an opposite polarity by means of a change-over switch.

A still further object of the invention is to provide a driving apparatus wherein the mobile body comprises a toy car.

A further object of the invention is to provide a driving apparatus wherein the contactless switch comprises a lead switch for operating through magnetic action.

The invention will be illustrated hereinbelow in more detail with respect to the several embodiments with reference to the accompanying drawings.

BRIEF DESCRIPTION OF THE DRAWINGS

FIG. 3 shows a circuit for exciting the electromagnet of the driving apparatus of the invention;

FIG. 4 is a schematic view showing a basic construction of another embodiment of the driving apparatus according to the invention; and FIG. 5 is a schematic view showing a basic construction of a further embodiment of the driving apparatus according to the invention.

DETAILED DESCRIPTION OF THE PREFERRED EMBODIMENTS

Figure 1:
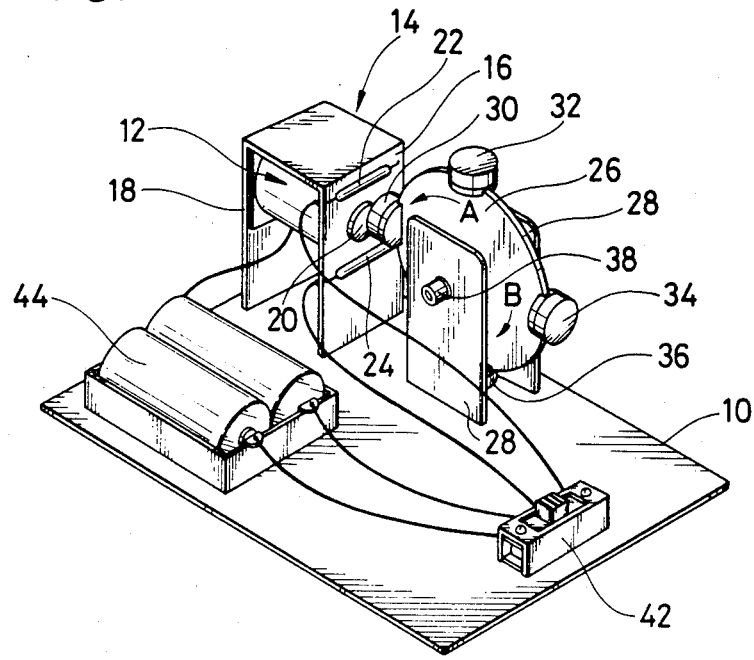
FIG. 1 is a perspective view of one embodiment of a driving apparatus according to the invention.
Figure 2:
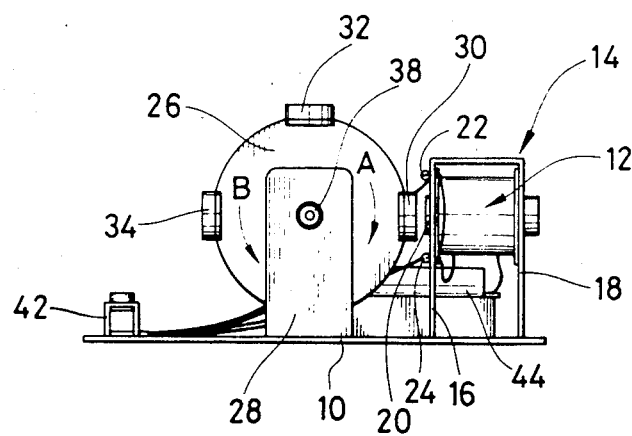
FIG. 2 is a side view of the driving apparatus of FIG. 1.

FIGS. 1 and 2 illustrate one embodiment of the driving apparatus according to the invention, wherein the numerical reference 10 shows a base plate, on a part of which is fixed an electromagnet 12 by means of a frame 14. In this case, the frame 14 at its opposite side walls 16, 18 is provided with holes, through which the pole 20 of the electromagnet is inserted to position the same at a predetermined location on the base plate 10. Further, on the frame at its side wall is arranged a pair of contactless switches 22, 24 each spaced from the pole 20 of the electromagnet 12, the pole extending from the frame 14 as seen in FIG. 1. In this case, the contactless switches 22, 24 may be constructed of, for example, a lead switch which operates through magnetic force.

Adjacent the frame side wall 16 is arranged a turning disk 26 which is turnably supported on a bearing frame 28 fixed to the base plate 10. Further, the turning disk 26 is provided on its circumference with a plurality of permanent magnets 30, 32, 34, 36 spaced a predetermined distance apart and with like polarities directed in one direction. With this arrangement, a shaft 38 for carrying the turning disk 26 on the base plate 10 is positioned in the same plane as the center of the pole 20 of the electromagnet 12, while each end face of the permanent magnets 30–36, on turning the disk 26, adapted to move in relation to the end face of the pole 20 of the electromagnet 12 so as to form a a predetermined gap therebetween.

In operation, when any one of the permanent magnets 30–36 is aligned with the pole 20 of electromagnet 12, an attractive force (namely, magnetic force) is generated between the pole 20 and one of the permanent magnet 30–36. The strength of the attractive force is proportional to the flux density between the end faces of the pole 20 and adjacent one of the permanent magnets 30–36, which flux density in turn is proportional to the area of overlap of the end faces of the pole 20 and the adjacent permanent magnet. If the area of overlap is too large, then when an electric source for energizing the electromagnet 12 is turned from OFF to ON, the attractive force will be excessively strong so that rotation of the turning disc 26 will not be smoothly started. In order to avoid such situation, each permanent magnet 30–36 is preferably positioned so that half of its end face (right or left half) is aligned with the end face of the pole 20, as illustrated in FIG. 1.

Reference will now be made to FIG. 3 which shows a circuit for exciting the electromagnet. The numeral reference 40 represents an exciting coil for the electromagnet 12. The exciting coil 40 at its one end is connected to the parallel connected contactless switches 22, 24 in parallel, which in turn are connected through a change-over switch 42 to a DC source 44. The DC source 44 at its center is connected to the other end of the exciting coil 40. In this embodiment, the change-over switch 42 consists of a two pole switch having two movable contacts 46, 48 and three fixed contacts for each pole, namely contacts designated A, OFF and B as shown in FIG. 3. The A contact associated with movable contact 46 and the B contact associated with movable contact 48 are connected to the contactless switch 22, while the B contact associated with movable contact 46 and the A contact associated with movable contact 48 are connected to the contactless switch 24. As seen in FIG. 3, movable contact 46 is connected to one DC source at its positive side while the movable contact 48 is connected to another DC source at its negative side. With the connections shown in FIG. 3 and as just described, when the movable contacts 46, 48 engage the B contacts and one of the contactless switches 22 is in its ON position, the current that flows therethrough is directed to the exciting coil, the circuit established including the negative pole of battery 44a, switch contact B, contactless switch 22, one end of coil 40 and from the opposite end of the coil to the positive terminal of battery 44a. On the other hand, if the contactless switch 24 is in its ON position when the movable contacts 46, 48 engage contacts B the current will flow from the positive terminal of battery 44b through switch 24 of coil 40 and from the coil back to the negative terminal of battery 44b. Thus, the exciting coil 40 may reversibly be energized to a reversible polarity depending on the switch condition of the contactless switches 22, 24. Similarly, when the movable contacts 46, 48 of the change-over switch 42 contact the A contacts, a reverse operation to that just described may be obtained. By virtue of the operation just described, the turning disc may be operated in reverse directions by simply moving the movable contacts 46, 48 from the B to the A contact and visa versa. In FIGS. 1 and 2, there is shown a switching mechanism 42 and a battery 44 which serve as the change-over switch 42 and the DC source 44 shown in FIG. 3.

The operation of the apparatus as shown in FIGS. 1 and 2 will now be described in association with the electromagnet exciting circuit.

When the movable contacts 46, 48 of the change-over switch 42 in the circuit contact, for example, the A contacts, one of the plurality of the permanent magnets 30–36 arranged on the turning disk 26 will be in a position close to one of the contactless switches 22 or 24 which turns to its ON position, thereby energizing the exciting coil 40 and hence electromagnet 12. More specifically, if all the permanent magnets have the same south S polarity in relation to pole 20 and if the permanent magnet 30 is close to to the contactless switch 22, then this switch 22 will turn to its ON position by virtue of the magnetic force exerted by the permanent magnet 30. Electromagnet 12 is then energized due to energization of coil 40 as previously described so that pole 20 attains a north pole. Thus, with permanent magnet 30 in close position to the contactless switch 22 an attractive magnetic force will be produced in relation to pole 20 which enables rotation of disk 26 in the direction A, as shown in FIGS. 1 and 2. Once disk 26 rotates, its inertia will continue its rotation and although the permanent magnet may no longer be in close relation to pole 20, rotation of the disk will be continued when permanent magnet 30 comes into close relation with contactless switch 24. When this occurs, contactless switch 24 is turned to its ON position through the magnetic force of the permanent magnet 30, contactless switch 22 being then in its OFF position. In this case, the electromagnet is excited so that pole 20 has a south polarity and since permanent magnet 30 also has a south polarity at its end face, a repulsive force is produced for rotating the turning disk 26 in the direction A and allowing the permanent magnet 30 to pass over the contactless switch 24.

As will be appreciated from the foregoing, the inertia of turning disk 26 enables the permanent magnets thereon to sequentially approach the contactless switches to permit continued rotation of disk 26 which provides a rotary driving force to the shaft 38.

The movable contacts 46, 48 of the change-over switch 42 in the circuit contact the B contacts, the reverse operation of that described is achieved. Namely, close position of permanent magnet 30 to the contactless switch 24 turn the latter to its ON position, thereby exciting the electromagnet 24 with its pole 20 in the N polarity. As a result, an attractive force is produced between the permanent magnet south polarity and the pole 20 north polarity, enabling disk 26 to rotate in direction B, as shown in FIGS. 1 and 2. During this rotation, the inertia of the turning disk 26 allows the permanent magnet 30 to approach the contactless switch 22, thereby turning the latter to its ON position the contactless switch 24 changing into its OFF position. In this case, the electromagnet 12 is energized so that pole 20 has a south polarity which produces a repulsive force in relation to the south polarity of the permanent magnet 30 for continuing rotation of disk 26 in direction B. In this way, the inertia of the turning disk 26 allows the permanent magnets sequentially to approach contactless switch 24, pole 20 and then the contactless switch 22 in order and to continue rotation in direction B.

When rotation of the turning disk 26 is to be discontinued, the movable contacts 46, 48 are moved to the OFF position thereby cutting off current flow from the DC source to the exciting coil 40.

FIG. 4 shows another embodiment of the driving apparatus according to the invention. The same reference characters are used in these figures as in FIGS. 1 and 2 to identify similar parts.

In this embodiment, a movable casting 50, such as a toy car, is provided at its bottom with the electromagnet 12, the pole 20 of which is extended through an opening in a base plate 52. The base plate 52 is provided at its outer bottom surface with a pair of the contactless switches 22, 24 symmetrically arranged to the pole 20 and in the moving direction of the casing. The movable casing 50 is provided with wheels 54, as well as the change-over switch 42 for control of excitation of electromagnet 24 by means of DC source 44. A base plate 56 forming a track for the movable casing is provided with a plurality of permanent magnets 30 in plate form and spaced from each other a predetermined distance and in predetermined direction.

Also in the driving apparatus of this embodiment thus constructed, the electromagnet 12 is arranged in movable casing and its winding is controlled for energization by the circuit described in relation to FIG. 3 for moving the movable casing forward or backward as a function of switch position of switch 42 in the sequential direction of the permanent magnets 30.

FIG. 5 shows a modified embodiment of the apparatus in FIG. 4, wherein the movable casing 50 is provided at its bottom plate 52 with a plurality of the permanent magnets along the moving direction of the casing 50, a predetermined distance apart, while the base plate 56 is provided with a combination of the electromagnets 12 having poles 20 and the corresponding pair of contactless switches 22, 24 symmetrically positioned with respect thereto as previously described. In this case, a plurality of the combinations of electromagnets and related contactless switches are preferably provided in the predetermined distance oppositely to at least one of the permanent magnets 30 on the movable casing 50. Also in this embodiment, similarly to the driving apparatus of FIG. 4, the movable casing may be sequentially moved forward or backward along the electromagnets under conjoint action of the electromagnets 12 and the permanent magnets 30.

As apparent from the foregoing embodiments, in the driving apparatus according to the invention, a plurality of permanent magnets are provided on a movable or immovable body (the rotary body 26 in FIG. 1 or the casing 50 in FIG. 5) with their polarity being the same and directed in one direction, while the electromagnet 14 is provided on the immovable (the frame 12 in FIG. 1 or the base plate 56 in FIG. 5) or the movable body (the casing 50 in FIG. 4) predeterminedly spaced for permanent magnets in order to permit either a rotary or retilinear movement of the movable body. As appreciated from the foregoing, for the driving apparatus of to the invention, a pair of the contactless switches are employed as circuit components for exciting the electromagnet the direction of rotation being controlled by reversing polarity with change-over switch, avoiding thereby abrasion of electrical contacts, leading to the superior results and durability of the driving apparatus. Also, as apparent either rotary or straight movement may be achieved as a function of the arrangement of the electromagnets and the cooperating permanent magnets, so that the driving apparatus may be adapted to many types of movable toys, such as a running toy car (straight movement), a merry-go-round (rotary movement) and others. For use in a toy car, a direct driving system may be achieved by arranging the permanent magnets with idle wheels. In this case, the driving mechanism for the toy car is quite simple, resulting in a considerable reduction in manufacturing costs.

Although the invention is described and illustrated with reference to the preferred embodiments, many changes and modifications may be carried out without departing from the scope and the spirit of the invention.

What is claimed is:

1. A driving apparatus for a movable toy comprising a mobile toy body, an immobile body comprising an unelectrified track along which said mobile body is movable, a plurality of permanent magnets affixed to the track in spaced apart relation, in the moving direction of the mobile body, all of the permanent magnets being positioned with their magnetic polarities facing in one and the same direction, at least one electromagnet having an exciting coil and being fixed to the mobile body for movement therewith, said electromagnet having only one pole at one end thereof, said one pole being adjacent to and spaced from the permanent magnets for sequential facing relation therewith when the mobile body is moved relative to said track, a pair of contactless switches, each arranged adjacent to and symmetrically on opposite sides of said one pole and lying in substantially the same plane therewith for sequential closure by said permanent magnets when the mobile body moves relative to said track in a given direction, and a circuit within said movable body and including a D.C. current source, said exciting coil and said contactless switches for energizing the exciting coil of the electromagnet with different polarities during said sequential closure of said contactless switches by said permanent magnets as said contactless switches move past each of said permanent magnets whereby to sequentially impart different polarities to said one pole for sequential attraction and repulsion of said one pole by each of said permanent magnets thereby to intensify the drive of the toy body along the unelectrified track, and a manually operated switch means for reversing the connection of said contactless switches to said circuit for reversing the moving direction of the mobile body.

2. The apparatus according to claim 1, wherein the contactless switches comprises a lead switch for operating through magnetic action.

3. The apparatus according to claim 1, wherein said manually operable switch is interposed in said circuit between said DC source and said contactless switches.

4. The driving apparatus of claim 3, wherein said manually operated switch is a two pole multiple position switch, said current source comprising two series connected batteries, one end of the exciting coil being effectively connected to the electrical joinder of said series connected batteries while the free terminals of the batteries are connected to movable contact arms of the two pole manually operated switch, one terminal of each of the contactless switches being connected to contacts, in non-aligned positions on each of the poles, the other terminal of each of the contactless switches being connected to the other end of said exciting coil.

* * * * *